April 24, 1951      C. G. BENNETT      2,550,520
JOINT STRUCTURE FOR LAMINATES
Filed Nov. 12, 1947
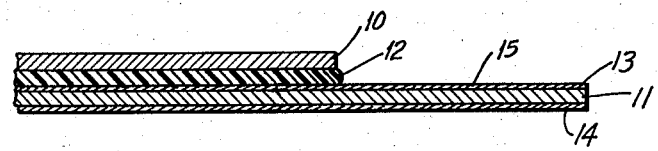
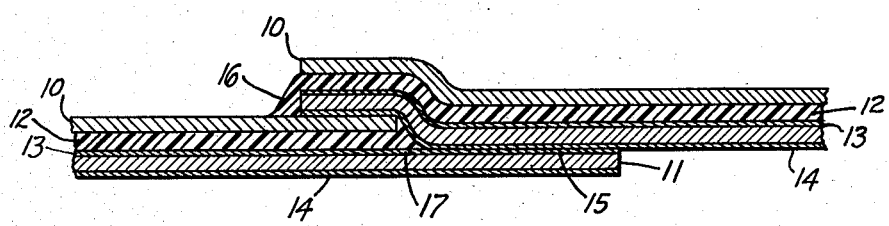
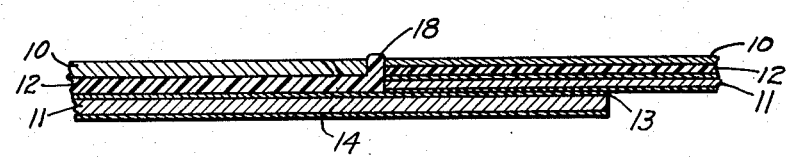
INVENTOR.
Clarence G. Bennett
BY
ATTORNEY Patented Apr. 24, 1951

2,550,520

UNITED STATES PATENT OFFICE 2,550,520

JOINT STRUCTURE FOR LAMINATES

Clarence G. Bennett, San Mateo, Calif.

Application November 12, 1947, Serial No. 785,494

3 Claims. (Cl. 229—48)

This invention relates to a laminated sheet structure, particularly to a joint therefor, and to blanks made of laminated material for the construction of bags, tubes, containers, and the like.

A great many sheet material laminates are in use for such purposes as wrappers, bags and sacks, box liners, and tubes. In such of these uses as require joints having structural strength and imperviousness to air or moisture, a good deal of difficulty is encountered due to the fact that one of the layers of the laminate, highly desirable because of a certain characteristic, will have at the same time characteristics which make it very difficult to seal either to itself or to an unlike layer. For example, vegetable parchment paper is a very desirable material for certain uses but it has the property of permitting the passage of moisture or water-vapor, and due to this characteristic and others is difficult to join permanently. In order to utilize the desirable characteristics of the vegetable parchment while at the same time avoiding moisture loss, in cases where it is a disadvantage, a laminate having, for example, a layer of water-proof cellophane may be utilized. When, however, it is attempted to make a joint, as in the preparation of a bag, it will be found that the commonly used lap joint requires a securement of parchment to cellophane. This has proved to be a very difficult problem to solve.

The invention disclosed herein provides a solution to the above-mentioned problem in that it allows a strong, impervious joint to be made, avoiding the necessity for securing of unlike materials together.

It is an object of the present invention to provide a joint structure for use in connection with laminates of unlike layers, whereby a strong and satisfactory joint may be achieved.

A further object is to provide laminated blanks for bags, tubes, etc., said blanks having an edge construction adapted to be folded over and secured to another edge to give a mechanically sound joint.

A still further object is to provide bags, tubes, etc., constructed of a laminated sheet material having unlike layers, and including a joint in which an outer layer is securely adhered to itself rather than to an unlike material.

In the drawing which accompanies the application,

Figure 1 is a cross-section of a particular laminate illustrating the invention.

Figure 2 is a similar section showing a joint made by the use of the material indicated in Figure 1.

Figure 3 is a representation of a different type of joint still utilizing the same structure.

In the drawings numeral 10 refers to a layer which may be, for example, parchment paper. Numeral 11 refers to an unlike material, for example, cellophane, while the two sheet materials are secured together by a layer 12, for example, of petroleum wax.

As indicated, the cellophane is coated on one or both sides, in this instance, on both sides, the coating 13 being heat-sealing lacquer, while the coating 14 may be heat-sealing lacquer or a moisture-proofing. For reasons which will become apparent, the cellophane layer extends beyond the boundary edge of the paper layer. Consideration of the nature of the laminate will indicate that if a sheet of this material having coincident edges be turned around upon itself to secure one edge to another by means of a lap joint, the cellophane will inevitably have to be secured to the parchment paper. It has proved to be difficult to make such a joint satisfactory in any respect, and impossible to secure a really satisfactory joint between materials of such different characteristics.

On consideration of Figure 2, which shows a lap joint in accordance with my invention, it will be noted that the cellophane layer 11 will be secured to itself in the area indicated by the numeral 15. If then, for example, layers 13 and 14 are both of a heat-sealing lacquer, a substantial and permanent joint is easily secured.

In the form of the joint or seam shown in Figure 2, however, the edge of the sheet material shown at the top is secured not only at the area 15 but further overlaps the parchment paper layer 10. In the case of the particular materials mentioned, the joint shown in Figure 2 is designed to be secured by the application of heat and pressure, thus not only will cellophane be sealed to cellophane in the area marked 15, but the wax from layer 12 will exude from the edges of the material at 16 and 17 to form secondary seals.

In some of the uses to which a laminate such as is described above is put, the vegetable parchment paper layer is on the inside of the bag or liner and is subject to the influence of moisture. In the conventional lap joint, even if the cellophane were reasonably well secured to the parchment paper in the beginning, the moisture moving by capillary action into the secured portion of the parchment will cause the joint to fail.

In the joint structure shown in Figure 2, moisture in the parchment paper layers is stopped, first by the wax exudate 17 from penetrating to the joint area 15. Moisture within the wrapper or bag, considered as the upper layer in this instance, is barred by the exudate 16.

In Figure 3, I have shown a joint structure wherein a portion of the parchment paper layer 10 is removed from adjacent the terminal edge area of the sheet 11. The other edge of the sheet butts substantially against the edge of the parchment sheet 10. It may be referred to as a butt-joint, though, of course, it is not strictly such. Here again, the area of the over-lap constitutes a strong and impervious joint and the wax exudate 18 seals the edges of the two sheets to improve the imperviousness of the joint.

One of the substantial uses for the joint structure which I have described is in the casing of certain meat and fish sausages, also cheeses, tamales, etc. This requires a tube which is best constructed from a long paper strip. In this embodiment of the invention, the strip will be as long as is convenient and, for example, twelve inches wide, referring to the cellophane, while the parchment paper layers secured thereto have coincident edges on one side and will be, for example, only eleven inches wide, whereby the cellophane layer extends approximately an inch beyond one edge of the parchment paper layer. Such a structure has been found well suited to the preparation of a strong and secure tube for the casing of certain types of sausages and the like, by joining the edges as indicated in Figure 2.

A further embodiment of the invention is involved in the preparation of blanks to be made into bags or sacks. In this instance, the longitudinal seam or joint of the bag may be provided for by having one edge of the laminated structure as indicated in Figure 1. For example, to prepare a bag approximately 8 by 6 inches, one may prepare a rectangular blank approximately 9 by 13 inches, and one of the 9 inch edges will have one of the layers of the laminate extended beyond the other or others, as indicated in Figure 1. When the 9 inch edges are joined one will have a tube which flat will measure 6 x 9 inches.

While I have in the above referred to particular materials for the various layers and adhesives, it will be obvious that a great deal of variation is possible. The invention will find utility in any case where a laminated sheet material must be joined by edges like those considered above and where the materials are of such nature that to secure one to the other is impracticable or even impossible. The term paper includes paper especially treated, as with melamine resins, etc. Some of the variations possible will be alluded to in the following and others will become apparent to those considering the application of the invention.

In the drawings the layer 10 may be a paper; cellophane, either coated or uncoated and either lacquered or unlacquered; cellulose acetate, coated or uncoated; ethyl cellulose; polyvinyl chloride, polyvinylidine, polyamide, ethylene resin, polystyrene, wax paper, metal foil, cloth, or in fact almost any sheet material desired.

The layer 11 may be any of the materials named above for layer 10, or others, and the invention will be of utility as long as the layers are of substantially different characteristics.

The laminating agent, layer 12, may be of silicate of soda, starch, dextrin, glue or animal or vegetable origin, latex, resin dispersions, casein, wax, asphalt, resin, vegetable wax, ester gum, cellulose nitrate, styrene, wax-alkyd-resin compound, cornstarch, bitumin, silicone compositions or any of many other like materials.

The coatings 13 and 14 may be any of the coatings used in the arts; in connection with any of the materials mentioned for layer 11, for example, lacquer such as cellulose nitrate, ethyl cellulose, cyclized rubber, vinylidene chloride, cellulose acetate, aqueous or non-aqueous, organic or inorganic adhesives or the known pressure sensitive adhesives may be used.

In case none of the coatings involved in any of the laminated layers is of a suitably adhesive nature, an adhesive specially compatible with the layer which contains the extended marginal portion will be employed. In this case, again, the problem of securing unlike layers to each other is avoided by the use of the joint structure which I have devised.

It is to be pointed out that the layer which has the extending margin need not be an outer layer as has been described above, but may be selected only on the ground that it offers the best possibilities of securing the edges of the structure together. More than three layers may be included in the laminate.

I use the term "effectively parallel" to cover instances where the edges might be pinked or scalloped for decorative or other reasons, or others in which they are not mathematically linear.

I claim:

1. A joint structure fashioned from a composite sheet having a first sheet member having a layer of heat sealing material on each side thereof, a petroleum wax layer on one of said heat sealing layers terminating short of the sheet edge to provide an exposed terminal area of the heat sealing material, and a second sheet member overlying and co-extensive with the paraffin wax layer; the joint comprising said composite sheet joined to itself with a portion thereof extending over and covering the exposed terminal area and with heat sealing surfaces on the first sheet in face-to-face engagement, the petroleum wax layer having been melted to provide a seal between the adjacent abutting terminal edges of the sheet.

2. A joint structure fashioned from a composite sheet having a first sheet member having a layer of heat sealing material on each side thereof, a petroleum wax layer on one of said heat sealing layers terminating short of the sheet edge to provide an exposed terminal area of the heat sealing material and a second sheet member overlying and coextensive with the paraffin wax layer; the joint comprising said composite sheet joined to itself with a portion thereof extending over and covering the exposed terminal area and with the adjacent terminal edges substantially in abutment with the heat sealing surfaces on the first sheet in face-to-face engagement, the petroleum wax layer having been melted to provide a seal between the adjacent abutting terminal edges of the sheet.

3. A joint structure fashioned from a composite sheet having a first sheet member having a layer of heat sealing material on each side thereof, a petroleum wax layer on one of said heat sealing layers terminating short of the sheet edge to provide an exposed terminal area of the heat sealing material, and a second sheet member overlying and coextensive with the paraffin wax layer; the joint comprising said composite sheet joined to itself with a portion thereof extending over and covering the exposed terminal area of the sheet and a portion of the second sheet member and with heat sealing surfaces on the first sheet in face-to-face engagement, the petroleum wax layer having been melted to provide a seal between the adjacent terminal edges of the sheet and the second sheet member and the portion of the composite sheet overlapping the second sheet member.

CLARENCE G. BENNETT.

REFERENCES CITED

The following references are of record in the file of this patent:

UNITED STATES PATENTS

| Number | Name | Date |
|---|---|---|
| 2,051,903 | Royal | Aug. 25, 1936 |
| 2,106,875 | Rowe | Feb. 1, 1938 |
| 2,374,128 | Pinckert | Apr. 17, 1945 |
| 2,442,936 | Rohdin | June 8, 1948 |